United States Patent [19]
Roesler et al.

[11] Patent Number: 5,952,445
[45] Date of Patent: Sep. 14, 1999

[54] WATER DISPERSIBLE COMPOUNDS CONTAINING ALKOXYSILANE GROUPS

[75] Inventors: Richard R. Roesler, Wexford, Pa.;
Lutz Schmalstieg, Köln, Germany

[73] Assignees: Bayer Corporation, Pittsburgh, Pa.;
Bayer Aktiengesellschaft, Leverkusen, Germany

[21] Appl. No.: 09/057,675

[22] Filed: Apr. 9, 1998

[51] Int. Cl.⁶ .................................................. C08G 77/26
[52] U.S. Cl. ................................ 528/28; 528/38; 528/34; 524/838
[58] Field of Search .................... 528/28, 38, 34; 524/838

[56] References Cited

U.S. PATENT DOCUMENTS

| | | | |
|---|---|---|---|
| 5,364,955 | 11/1994 | Zwiener et al. | 556/418 |
| 5,554,686 | 9/1996 | Frisch, Jr. et al. | 524/588 |
| 5,859,118 | 1/1999 | Roesler et al. | 524/493 |

*Primary Examiner*—Margaret W. Glass
*Attorney, Agent, or Firm*—Joseph C. Gil; Thomas W. Roy

[57] ABSTRACT

The present invention relates to compounds which are substantially free from isocyanate groups, have an alkoxysilane group content (calculated as Si, MW 28) of 1 to 6% by weight, based on the weight of the compounds, and containing sufficient chemically incorporated hydrophilic groups to form a stable dispersion with water, wherein the alkoxysilane groups are incorporated as the reaction products of a) a polyisocyanate component having a minimum average functionality of 2.4 and containing at least 50% by weight of polyisocyanate adducts and b) compounds containing secondary amino groups and alkoxysilane groups.

The present invention also relates to the use of these compounds for the preparation of coatings, sealants and adhesives.

14 Claims, No Drawings

WATER DISPERSIBLE COMPOUNDS CONTAINING ALKOXYSILANE GROUPS

BACKGROUND OF THE INVENTION

1. Field of the Invention

The present invention relates to water dispersible compounds, which contain alkoxysilane groups and are substantially free from isocyanate groups, and to their use in aqueous, one-component coating compositions.

2. Description of the Prior Art

Alkoxysilanes containing amino groups are key components for linking conventional polymer chemistry with silicone chemistry. The alkoxysilane groups crosslink by "silane polycondensation" in the presence of moisture, and the amino groups can be incorporated into polymers, such as polyurethanes and polyureas.

U.S. Pat. No. 5,364,955 discloses that by initially reacting amino-functional silanes with maleic or fumaric acid esters to form secondary amino groups (i.e., aspartates), it is then possible to react these aspartates with NCO prepolymers without encountering incompatibility, inhomogeneity or extremely high viscosities in the reaction products. Copending application, U.S. Ser. No. 08/814,561, discloses the reaction of aspartates with monomeric polyisocyanates or polyisocyanate adducts to form compounds containing urea and alkoxysilane groups.

One of the uses for these compounds is to mix them with water either alone or with other compounds containing alkoxysilane groups to form stable sol-gel formulations. In these formulations water is required to hydrolyze the silyl ether groups to form hydroxy silanes. The terminal Si—OH groups can then be crosslinked into a polysiloxane network through a condensation reaction to form Si—O—Si bonds. However, when it is attempted to mix the compounds described in the preceding copending application with water, stable dispersions are not formed.

It is an object of the present invention to provide compounds containing alkoxysilane groups, which 1) may be mixed with water to form stable water-in-oil or oil-in-water dispersions and 2) cure to form smooth, clear coatings. It is an additional object of the present invention to provide hydrophilic compounds containing alkoxysilane groups that can be cured by silane polycondensation to form coatings, sealants, and adhesives.

These objects may be achieved with the water dispersible compounds containing alkoxysilane groups according to the present invention described hereinafter. These compounds may be prepared by reacting a polyisocyanate component with compounds containing secondary amino groups and alkoxysilane groups.

SUMMARY OF THE INVENTION

The present invention relates to compounds which are substantially free from isocyanate groups, have an alkoxysilane group content (calculated as Si, MW 28) of 1 to 6% by weight, based on the weight of the compounds, and contain sufficient chemically incorporated hydrophilic groups to form a stable dispersion with water, wherein the alkoxysilane groups are incorporated as the reaction products of a) a polyisocyanate component having a minimum average functionality of 2.4 and containing at least 50% by weight of polyisocyanate adducts and b) amino compounds corresponding to formula I

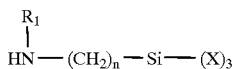

wherein
- X represents identical or different organic groups which are inert to isocyanate groups below 100° C., provided that at least one of these groups is an alkoxy group,
- $R_1$ represents an organic group which is inert to isocyanate groups at a temperature of 100° C. or less, and
- n is an integer from 1 to 8.

The present invention also relates to the use of these compounds for the preparation of coatings, sealants and adhesives.

DETAILED DESCRIPTION OF THE INVENTION

The compounds according to the present invention are based on the reaction products of polyisocyanates, amino-functional silanes and compounds containing hydrophilic groups, such as non-ionic, anionic and/or cationic groups. The silanes are incorporated through the formation of urea groups, while the hydrophilic groups are preferably incorporated through the formation of urethane groups. The compounds according to the invention are substantially free from isocyanate groups, i.e., they contain less than 0.1% by weight of isocyanate groups, based on the weight of the compounds.

Suitable compounds containing alkoxysilane groups and amino groups include those corresponding to formula I wherein
- X represents identical or different organic groups which are inert to isocyanate groups below 100° C., provided that at least one of these groups is an alkoxy or acyloxy group, preferably alkyl or alkoxy groups having 1 to 4 carbon atoms and more preferably alkoxy groups,
- $R_1$ represents an organic group which is inert to isocyanate groups at a temperature of 100° C. or less, preferably an alkyl, cycloalkyl or aromatic group having 1 to 12, preferably 1 to 8 carbon atoms, or a group corresponding to formula II

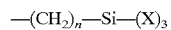

and
- n is an integer from 1 to 8, preferably 2 to 4 and more preferably 3.

Especially preferred are compounds in which X represents methoxy, ethoxy groups or propoxy groups, more preferably methoxy or ethoxy groups and most preferably methoxy groups, and n is 3.

Examples of suitable aminoalkyl alkoxysilanes of formula I containing secondary amino groups include N-phenylaminopropyl-trimethoxysilane (available as A-9669 from OSI Specialties, Witco), bis-(γ-trimethoxysilylpropyl)amine (available as A-1170 from OSI Specialties, Witco), N-cyclohexylaminopropyltriethoxy-silane, N-methylaminopropyl-trimethoxysilane and the corresponding alkyl diethyoxy and dimethoxy silanes.

A special group of compounds containing alkoxysilane groups are those which also contain aspartate groups, such as those corresponding to formula III

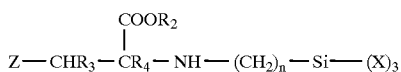 (III)

wherein

X and n are as defined above,

Z represents COOR$_5$ or an aromatic ring, preferably COOR$_5$,

R$_2$ and R$_5$ are identical or different and represent organic groups which are inert to isocyanate groups at a temperature of 100° C. or less, preferably alkyl groups having 1 to 9 carbon atoms, more preferably methyl, ethyl or butyl groups and R$_3$ and R$_4$ are identical or different and represent hydrogen or organic groups which are inert to isocyanate groups at a temperature of 100° C. or less, preferably hydrogen.

The compounds of formula III are prepared by reacting aminoalkyl alkoxysilanes corresponding to formula IV $$H_2N-(CH_2)_n-Si-(X)_3 \quad (IV)$$

with maleic, fumaric or cinnamic acid esters corresponding to formula V $$Z-CR_3=CR_4-COOR_2 \quad (V).$$

Examples of suitable aminoalkyl alkoxysilanes of formula IV include 2-aminoethyl-dimethylmethoxy-silane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane and 3-aminopropyl-triisopropoxysilane. 3-aminopropyl-trimethoxysilane and 3-aminopropyl-triethoxysilane are particularly preferred.

Examples of optionally substituted maleic, fumaric or cinnamic acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; the methyl, ethyl and butyl esters of cinnamic acid; and the corresponding maleic, fumaric and cinnamic acid esters substituted by methyl in the 2- and/or 3-position. The dimethyl esters of maleic acid are preferred and the diethyl and dibutyl esters are especially preferred.

The reaction of primary amines with maleic, fumaric or cinnamic acid esters to form the aspartates of formula III is known and described, e.g. in U.S. Pat. No. 5,364,955, which is herein incorporated by reference. The preparation of the aspartates may be carried out, for example, at a temperature of 0 to 100° C. using the starting materials in such proportions that at least 1, preferably 1, olefinic double bond is present for each primary amino group. Excess starting materials may be removed by distillation after the reaction. The reaction may be carried out with or without a solvent, but the use of a solvent is less preferred. If a solvent is used, dioxane is an example of a suitable solvent.

The compounds containing alkoxysilane groups and amino groups are reacted in an amount sufficient to incorporate 1 to 6% by weight, preferably 2 to 6% by weight and more preferably 2 to 5% by weight, of alkoxysilane groups (calculated as Si, MW 28), based on the weight of the compounds according to the invention. The compounds of formula III are colorless to pale yellow. They may be reacted with the polyisocyanate component to form the compounds according to the invention containing alkoxysilane groups without further purification.

In accordance with the present invention the special type of urea groups formed by the reaction of the compounds containing alkoxysilane groups and aspartate groups with the polyisocyanate component may be converted to hydantoin groups in known manner by heating the compounds at elevated temperatures, optionally in the presence of a catalyst. Therefore, the term "urea groups" is also intended to include other compounds containing the group, N—CO—N, such as hydantoin groups.

The polyisocyanate component for preparing the compounds according to the invention has a minimum average functionality of 2.4, preferably to 2.6 and more preferably 2.8, and a maximum average functionality of 6, more preferably 5. The polyisocyanate component may contain monomeric diisocyanates or polyisocyanate adducts having a functionalities which do not satisfy these requirements, provided that the average functionality of the polyisocyanate component satisfies these requirements.

The polyisocyanate component contains at least 50% by weight, preferably at least 70% by weight, more preferably at least 95% by weight of polyisocyanates adducts containing isocyanurate, uretdione, biuret, urethane, allophanate, carbodiimide and/or oxadiazine-trione, preferably isocyanurate, uretdione, biuret and/or allophanate groups. In addition to the polyisocyanate adducts the polyisocyanate component may optionally contain either monomeric polyisocyanates or other polyisocyanate adducts.

Suitable monomeric diisocyanates, which may be present in the polyisocyanate component in the form of monomers or which may be used to prepare the polyisocyanate adducts, are represented by the formula

in which R represents an organic group obtained by removing the isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,1 2-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Monomeric polyisocyanates containing 3 or more isocyanate groups such as 4-isocyanantomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be present in the polyisocyanate component or used to prepare the polyisocyanate adducts.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

In accordance with the present invention at least a portion of the polyisocyanate component is in the form of a polyisocyanate adduct having an average functionality of 2 to 6 and an NCO content of 5 to 30% by weight. Examples include:

1) Isocyanurate group-containing polyisocyanates which may be prepared as set forth in DE-PS 2,616,416, EP-OS 3,765, EP-OS 10,589, EP-OS 47,452, US-PS 4,288,586 and US-PS 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g, a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to monoallophanate groups of about 10:1 to 1:10, preferably about 5:1 to 1:7.

7) Carbodiimide group-containing polyisocyanates which may be prepared by oligomerizing di- or polyisocyanates in the presence of known carbodiimidization catalysts as described in DE-PS 1,092,007, US-PS 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups, allophanate groups and/or uretdione groups.

Suitable hydrophilic compounds which can be used to enable the compounds containing alkoxysilane groups to be stably dispersed in an aqueous medium are compounds containing lateral or terminal, hydrophilic ethylene oxide units and/or compounds containing ionic or potential ionic groups. The ionic or potential ionic groups may be either anionic or cationic groups, preferably anionic groups. Examples of anionic groups include carboxylate and sulfonate groups, while examples of cationic groups include ammonium and sulfonium groups.

Compounds which are stably dispersed are those that remain mixed with water, either in the form of an oil-in-water emulsion or a water-in-oil emulsion, without settling, coagulation or separation for a period of time sufficient to use the dispersion for its intended purpose. In accordance with the present invention the compounds containing alkoxysilane groups also contain a minimum of 2.5% of hydrophilic ethylene oxide units, based on the weight of the compounds containing alkoxysilane groups, or a minimum of 5 milliequivalents of ionic groups, per 100 parts of the compounds containing alkoxysilane groups.

When only hydrophilic ethylene oxide units are used to provide hydrophilicity, they are generally incorporated in an amount of 5 to 35%, preferably 10 to 30% and more preferably about 12 to 25% by weight, based on the weight of the compounds containing alkoxysilane groups.

Suitable compounds for incorporating the lateral or terminal, hydrophilic ethylene oxide units are known and disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example, propylene oxide.

When only ionic groups are used to provide hydrophilicity, they are incorporated in an amount sufficient to provide an ionic group content of 10 to 200 milliequivalents, preferably 10 to 100 milliequivalents and more preferably 25 to 50 milliequivalents, per 100 g of the compounds containing alkoxysilane groups.

The ionic groups are formed by neutralizing the corresponding potential ionic groups either prior to, during or after formation of the compounds containing alkoxysilane groups. When the potential ionic groups are neutralized prior to their incorporation into the these compounds, the ionic groups are incorporated directly. When neutralization is performed subsequent to forming these compounds, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents. Within the context of this invention, the term "neutralizing agents" is meant to embrace all types of agents which are useful for converting potential ionic groups to ionic groups.

The compounds containing alkoxysilane groups according to the invention are prepared by reacting the polyisocyanate component with the amino-functional silanes and the hydrophilic compounds at a ratio of isocyanate groups to isocyanate-reactive groups of approximately 1:1, such that the resulting product is substantially free of isocyanate groups. The reaction is preferably carried out by incrementally adding the isocyanate-reactive compound to the polyisocyanate. The amino-functional silane and the isocyanate-reactive hydrophilic compound may be added sequentially or in admixture, preferably the hydrophilic compound is added first, followed by the amino-functional silane.

The reaction to form the urea groups is conducted at a temperature of 10 to 100° C., preferably 20 to 80° C. and more preferably 20 to 50° C., while the reaction to incorporate isocyanate-reactive hydrophilic compounds is conducted at a temperature of 20 to 150° C., preferably 50 to 120C. and more preferably 60 to 100° C.

The compounds of the present invention are suitable for use in aqueous, one-component, coating, sealing or adhesive compositions, which can be cross-linked by "silane polycondensation," i.e., the hydrolysis and condensation of silane groups (Si—OR) to form siloxane groups (Si—O—Si). When used for this purpose, these compounds may be used as mixtures with suitable acidic or basic catalysts. Examples include acids such as paratoluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula IV, also accelerate hardening of the compounds according to the invention.

The one-component compositions, which may be present either as oil-in-water or water-in-oil emulsions, preferably have a solids content of 20 to 80% by weight, more preferably 30 to 70% by weight and most preferably 35 to 50% by weight, based on the weight of the one-component composition. The compositions may also contain other compounds containing alkoxysilane groups as co-reactants for the compounds containing alkoxysilane groups, e.g, to provide a composition with increased inorganic character. Examples of these co-reactants include tetramethoxy silane, tetraethoxy silane, methyl triethoxy silane, methyl trimethoxy silane, ethyl triethoxy silane, octyl triethoxy silane and dimethyl diethoxy silane.

The compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating or roll coating. The coating compositions may be clear or pigmented lacquers.

The one-component compositions may be cured at ambient temperature, although it is preferred to cure these compositions at elevated temperatures of 80 to 250° C., preferably 120 to 180° C., in order to obtain optimum properties.

The presence of co-reactants in the one-component compositions can be used to vary the properties or the resulting products, e.g., coatings prepared from these compositions have different performance properties, e.g. higher hardness, when compared to coatings prepared from compositions that do not contain these co-reactants.

The invention is further illustrated but is not intended to be limited by the following examples in which all parts and percentages are by weight unless otherwise specified.

EXAMPLES

Polyisocyanate 1

An isocyanurate group-containing polyisocyanate prepared from 1,6-hexamethylene diisocyanate and having an isocyanate content of 21.6%, a monomeric diisocyanate content of <0.2% and a viscosity at 20° C. of 3000 mPa.s (available from Bayer Corporation as Desmodur N 3300).

Polyether 1

A polyethylene oxide monool prepared by the ethoxylation of methanol and having a molecular weight of 750 (available from Union Carbide as Carbowax 750).

Polyether 2

A polyethylene oxide monool prepared by the ethoxylation of methanol and having a molecular weight of 550 (available from Union Carbide as Carbowax 550).

Example 1

Preparation of N-(3-trimethoxysilylpropyl) Aspartic Acid Diethyl Ester 1438 parts (8.27 equiv.) of 3- aminopropyltrimethoxysilane were added to a 5 liter flask fitted with agitator, thermocouple, nitrogen inlet and addition funnel with condenser. 1423.2 parts (8.27 equiv.) of diethyl maleate were added dropwise over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete. The product, N-(3-trimethoxysilylpropyl) aspartic acid diethyl ester, had a viscosity of 11 mPa.s at 25° C.

Example 2

Preparation of Water Dispersible Resin 1

195 parts (1 equiv) of polyisocyanate 1 were added at ambient temperature to a three neck, 5 liter, round bottom flask equipped with an agitator, nitrogen inlet, thermocouple and addition funnel with condenser. The reaction flask was heated to 60° C. 90 parts (0.12 equiv.) of polyether 1, heated to 60° C., was added to the reaction flask through the addition funnel over a twenty minute period in order to control the exotherm for the formation of the urethane. The reaction was maintained at 60° C. for 4 hours, at which time the isocyanate content was 13.8% (theoretical NCO 13.0%).

The reaction was cooled to 40° C. and 341 parts (0.93 equiv.) of N-(3-trimethoxysilylpropyl) aspartic acid diethyl ester were added through an addition funnel to control the exotherm. The reaction was heated for an additional 3 hours until no isocyanate groups remained as determined by IR spectroscopy. After cooling to room temperature, the resulting product had a viscosity of >100,000 mPa.s at 25° C.

20 parts of this product was combined with 10 parts of water and stirred at high speed with a lightning mixer. A stable dispersion resulted. Cured coatings could be prepared by the addition of a water compatible catalyst.

Example 3
Preparation of Water Dispersible Resin 2

195 parts (1 equiv) of polyisocyanate 1 were added at ambient temperature to a three neck, 5 liter, round bottom flask equipped with an agitator, nitrogen inlet, thermocouple and addition funnel with condenser. The reaction flask was heated to 60° C. 82.5 parts (0.15 equiv.) of polyether 2, heated to 60° C., was added to the reaction flask through the addition funnel over a twenty minute period in order to control the exotherm for the formation of the urethane. The reaction was maintained at 60° C. for 4 hours, at which time the isocyanate content was 14.4% (theoretical NCO 14.1%).

The reaction was cooled to 40° C. and 312 parts (0.85 equiv.) of N-(3-trimethoxysilylpropyl) aspartic acid diethyl ester were added through an addition funnel to control the exotherm. The reaction was heated for an additional 3 hours until no isocyanate groups remained as determined by IR spectroscopy. After cooling to room temperature, the resulting product had a viscosity of >100,000 mPa.s at 25° C.

20 parts of this product was combined with 10 parts of water and stirred at high speed with a lightning mixer. A stable dispersion resulted. Cured coatings were prepared as described in Example 5.

Example 4
Preparation of water dispersible resin 3

195 parts (1 equiv) of polyisocyanate 1 were added at ambient temperature to a three neck, 5 liter, round bottom flask equipped with an agitator, nitrogen inlet, thermocouple and addition funnel with condenser. 242 parts (0.66 equiv.) of N-(3-trimethoxysilylpropyl) aspartic acid diethyl ester were added resulting in an exotherm to 60° C. After cooling the reaction mixture, 181.5 parts (0.33 equiv.) of polyether 2, heated to 60° C., were added to the reaction flask as quickly as possible. A mild exotherm raised the temperature to 60° C. The reaction was maintained at 60° C. for 4 hours until no isocyanate groups remained as determined by IR spectroscopy. After cooling to room temperature, the resulting product had a viscosity of >100,000 mPa.s at 25° C.

20 parts of this product was combined with 10 parts of water and stirred at high speed with a lightning mixer. A clear solution resulted. Cured coatings could be prepared by the addition of a water compatible catalyst.

Example 5
Preparation of Coatings

Water dispersible resin 2 was dispersed in water on a high speed mixer and mixed with catalyst. The resulting mixtures were used to prepare films which were drawn down on cold rolled steel at a wet film thickness sufficient to provide a dry film thickness of 1 to 1.5 mils and cured at a temperature of 1300° C. for 30 minutes. The amounts of the various components and the properties of the resulting coatings are set forth in the following table.

| | Coating Composition (Amounts in parts) | | | |
|---|---|---|---|---|
| Ingredient | 1 | 2 | 3 | 4 |
| Water dispersible resin 2 | 10 | 10 | 10 | 10 |
| Water | 10 | 10 | 10 | 10 |
| Catalyst | 0.1/A | 0.1/B | 1.1/C | 0.1/D |
| Properties | | | | |
| MEK Double Rubs | 15 | 100 | 80 | 100 |
| Pencil Hardness | B | F | HB | HB |

A—p-toluene sulfonic acid
B—a blocked acid catalyst based on p-toluene sulfonic acid and proprietary amine (available as Nacure 2558 from King Industries)
C—a phenyl acid phosphate (available form as PA75 from Albright and Wilson)
D—a blocked acid catalyst based on dinonylnaphthaline monosulfonic acid and a proprietary amine (available as Nacure 1323 from King Industries)

MEK double rubs was determined by wetting a cloth with methyl ethyl ketone and then rubbing each panel up to 100 times. A double rub consists of one back and forth rub against the coated panel. Values of less than 100 indicate the number of double rubs before the coatings was destroyed.

Pencil hardness was determined in accordance with ASTM D-3363. The order of hardnesses are as follows from softest to hardest: 6B to 1B, HB, F, 1H to 8H.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A compound which is substantially free from isocyanate groups, has an alkoxysilane group content (calculated as Si, MW 28) of 1 to 6% by weight, based on the weight of the compound, and containing sufficient chemically incorporated hydrophilic groups to form a stable dispersion with water, wherein the alkoxysilane groups are incorporated as the reaction product of a) a polyisocyanate component having a minimum average functionality of 2.8 and containing at least 50% by weight of a polyisocyanate adduct and b) an amino compound corresponding to formula I

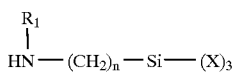

(I)

wherein

X represents identical or different organic groups which are inert to isocyanate groups below 100° C., provided that at least one of these groups is an alkoxy group, $R_1$ represents an organic group which is inert to isocyanate groups at a temperature of 100° C. or less and n is an integer from 1 to 8.

2. The compound of claim 1 wherein said amino compound corresponds to formula III

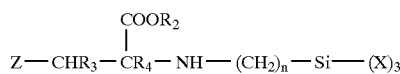

(III)

wherein
  Z represents $COOR_5$ or an aromatic ring,
  $R_2$ and $R_5$ are identical or different and represent organic groups which are inert to isocyanate groups at a temperature of 100° C. or less, and
  $R_3$ and $R_4$ are identical or different and represent hydrogen or organic groups which are inert to isocyanate groups at a temperature of 100° C. or less.

3. The compound of claim 2 wherein
  X represents identical or different alkyl or alkoxy groups having 1 to 4 carbon atoms,
  Z represents $COOR_5$,
  $R_2$ and $R_5$ are identical or different and represent alkyl groups having 1 to 9 carbon atoms,
  $R_3$ and $R_4$ represent hydrogen and
  n is an integer from 2 to 4.

4. The compound of claim 2 wherein
  X represents identical or different alkoxy groups having 1 to 4 carbon atoms,
  Z represents $COOR_5$,
  $R_2$ and $R_5$ are identical or different and represent methyl, ethyl or butyl,
  $R_3$ and $R_4$ represent hydrogen and
  n is 3.

5. The compound of claim 1 wherein the polyisocyanate component contains at least 70% by weight of a polyisocyanate adduct.

6. The compound of claim 2 wherein the polyisocyanate component contains at least 70% by weight of a polyisocyanate adduct.

7. The compound of claim 3 wherein the polyisocyanate component contains at least 70% by weight of a polyisocyanate adduct.

8. The compound of claim 4 wherein the polyisocyanate component contains at least 70% by weight of a polyisocyanate adduct.

9. The water dispersible compound of claim 5 wherein said polyisocyanate adduct contains isocyanurate groups, biuret groups, allophanate groups and/or uretdione groups.

10. The water dispersible compound of claim 6 wherein said polyisocyanate adduct contains isocyanurate groups, biuret groups, allophanate groups and/or uretdione groups.

11. The water dispersible compound of claim 7 wherein said polyisocyanate adduct contains isocyanurate groups, biuret groups, allophanate groups and/or uretdione groups.

12. The water dispersible compound of claim 8 wherein said polyisocyanate adduct contains isocyanurate groups, biuret groups, allophanate groups and/or uretdione groups.

13. A one-component coating, sealant or adhesive composition wherein the binder comprises the water dispersible compound of claim 1.

14. A one-component coating, sealant or adhesive composition wherein the binder comprises the water dispersible compound of claim 1 and an additional compound containing alkoxy silane groups.

* * * * *